US011359773B2

(12) United States Patent
He

(10) Patent No.: US 11,359,773 B2
(45) Date of Patent: Jun. 14, 2022

(54) LIGHT EMITTING ELEMENT AND PROCESSING APPARATUS THEREFOR

(71) Applicant: GANZHOU HESHENG PRECISION ELECTRONICS CO., LTD., Ganzhou (CN)

(72) Inventor: Yaowen He, Ganzhou (CN)

(73) Assignee: GANZHOU HESHENG PRECISION ELECTRONICS CO., LTD., Jiangxi (CN)

( * ) Notice: Subject to any disclaimer, the term of this patent is extended or adjusted under 35 U.S.C. 154(b) by 0 days.

(21) Appl. No.: 17/244,543

(22) Filed: Apr. 29, 2021

(65) Prior Publication Data

US 2021/0348726 A1 Nov. 11, 2021

(30) Foreign Application Priority Data

May 7, 2020 (CN) .......................... 202020737011.9

(51) Int. Cl.
| | |
|---|---|
| *B29C 45/14* | (2006.01) |
| *F21K 9/90* | (2016.01) |
| *F21S 4/10* | (2016.01) |
| *F21V 23/00* | (2015.01) |
| *F21Y 115/10* | (2016.01) |
| *B29C 45/00* | (2006.01) |

(52) U.S. Cl.
CPC .......... *F21K 9/90* (2013.01); *B29C 45/14065* (2013.01); *B29C 45/14598* (2013.01); *F21S 4/10* (2016.01); *F21V 23/001* (2013.01); *B29C 45/0084* (2013.01); *F21Y 2115/10* (2016.08)

(58) Field of Classification Search
CPC . B29C 45/14; B29C 45/2708; B29C 45/1671; B29C 45/14016; B29C 45/14057
See application file for complete search history.

(56) References Cited

U.S. PATENT DOCUMENTS

| | | | | |
|---|---|---|---|---|
| 2,174,628 | A | * 10/1939 | Hansgerull | ............... H01J 9/28 228/196 |
| 3,900,278 | A | * 8/1975 | Beck | ................. B29C 45/14639 425/123 |
| 7,267,791 | B2 | * 9/2007 | Ricking | .............. B29C 45/1671 264/245 |

(Continued)

FOREIGN PATENT DOCUMENTS

| | | |
|---|---|---|
| CN | 1310307 A | 8/2001 |
| CN | 110736034 A | 1/2020 |
| WO | WO-2019041745 A1 | 3/2019 |

*Primary Examiner* — Joseph S Del Sole
*Assistant Examiner* — Thu Khanh T Nguyen
(74) *Attorney, Agent, or Firm* — Perry + Currier Inc.

(57) ABSTRACT

Embodiments of the present disclosure provide a light emitting element and a processing apparatus therefor and relate to the technical field of light emitting devices. The light emitting element includes a light-emitting lamp bead (s), a connecting wire, and a covering member(s). The light-emitting lamp bead is welded to the connecting wire to form a welding joint. The covering member covers the light-emitting lamp bead and the welding joint. The covering member is integrally formed by injection molding. The present disclosure solves the technical problem existing in the prior art that the service life is adversely affected and the appearance is deteriorated because the welding joints are oxidized after a period of time.

10 Claims, 2 Drawing Sheets

(56) References Cited

U.S. PATENT DOCUMENTS

| | | | |
|---|---|---|---|
| 7,988,332 B2* | 8/2011 | Lo | H05B 45/30 362/249.05 |
| 2012/0275157 A1* | 11/2012 | Hsu | F21S 4/22 362/249.06 |
| 2017/0023223 A1 | 1/2017 | Tsai | |
| 2018/0209595 A1 | 7/2018 | Liu | |
| 2021/0071829 A1* | 3/2021 | Shan | B29C 45/14639 |
| 2021/0071854 A1 | 3/2021 | Shan et al. | |

* cited by examiner

LIGHT EMITTING ELEMENT AND PROCESSING APPARATUS THEREFOR

CROSS-REFERENCE TO RELATED APPLICATIONS

The present disclosure claims priority to Chinese Patent Application No. 2020207370119, filed with the Chinese Patent Office on May 7, 2020, entitled "Light Emitting Element and Processing Apparatus Therefor", which is incorporated herein by reference in its entirety.

TECHNICAL FIELD

The present disclosure relates to the technical field of light emitting devices, and in particular to a light emitting element and a processing (or machining) apparatus therefor.

BACKGROUND ART

With the development of science and technology, lamps are not only limited to the main function of lighting, but also have decorative and advertising functions. A variety of modeled lamps are made by combining models and kits with string lights, in which LED lamp beads used are all conventional plug-in lamps. Another type of modeled lamps are modeled copper wire lamps made of patch LED lamp beads, which are manufactured from copper wire string lights directly passing through individual models with holes and then fixed with glue.

The inventors have found in the research that the conventional modeled lamps have at least the following disadvantages. Both the lamp beads and the solder joints between the lamp beads and the light strings are exposed outside after installation, and the solder joints are oxidized after a period of time, which adversely affects the service life and results in poor appearance.

SUMMARY

An embodiment of the present disclosure provides a light emitting element, which includes: light-emitting lamp bead, a connecting wire, and covering member.

The light-emitting lamp bead is welded to the connecting wire to form a welding joint, the covering member covers the light-emitting lamp bead and the welding joint, and the covering member is integrally formed by injection molding.

An embodiment of the present disclosure further provides a processing apparatus for processing the light emitting element described above. The processing apparatus includes an injection molding mechanism and a molding die.

The molding die is provided with a fixing groove configured to fix the light-emitting lamp bead and the connecting wire, and the injection molding mechanism is configured to form the covering member around the surfaces of the light-emitting lamp bead and the welding joint by injection molding.

BRIEF DESCRIPTION OF THE DRAWINGS

In order to more clearly illustrate technical solutions of specific embodiments of the present disclosure or of the prior art, drawings required for use in the description of the specific embodiments or the prior art will be described briefly below. It is obvious that the drawings in the following description are illustrative of some embodiments of the present disclosure. It will be understood by those of ordinary skill in the art that other drawings can also be obtained from these drawings without any inventive effort.

REFERENCE NUMERALS

Figure 1:
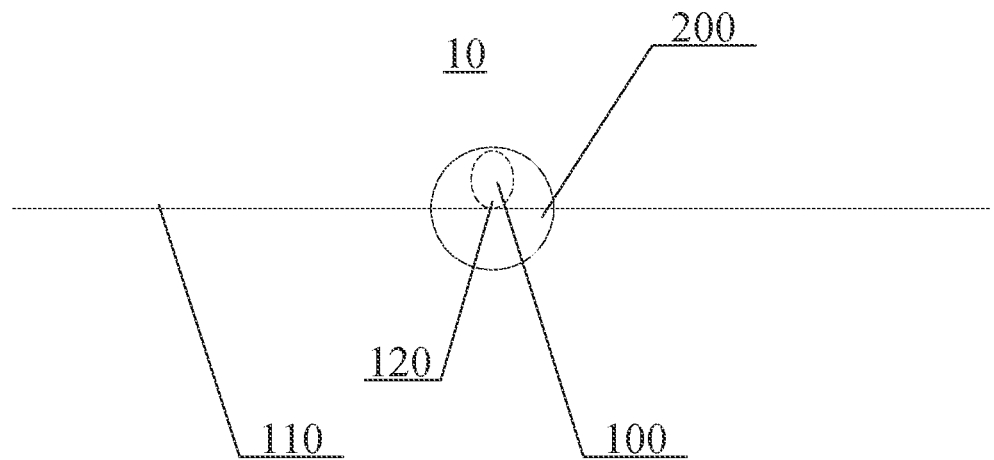
FIG. 1 is a schematic overall structural diagram of a light emitting element according to an embodiment of the present disclosure.

10—light emitting element; 100—light—emitting lamp bead; 110—connecting wire; 120—welding joint; 200—covering member; 20—processing apparatus; 21—fixing frame; 300—injection molding mechanism; 400—molding die; 500—wire unreeling member; 600—wire take-up member; 700—wire tightening member; 710—upper roller; 720—lower roller; 730—support frame; 800—wire pressing member 810—movable plate; 820—fixed plate; 830—driving member; 900—positioning member 910—positioning through hole.

DETAILED DESCRIPTION OF THE EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that the terms such as "center", "up", "down", "left", "right", "vertical", "horizontal", "inside", and "outside" indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first", "second", and "third" are used for distinguishing the description only, and should not be understood as an indication or implication of relative importance.

In addition, the term "horizontal", "vertical", "overhanging", or the like means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that terms "arranged", "mounted", "coupled", and "connected" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

The present disclosure provides a light emitting element and a processing apparatus therefor to ameliorate the shortcomings of the prior art, thereby solving the technical problems of the conventional modeled lamps existing in the prior art, which are adversely affected in terms of service life and have poor appearance because both the lamp beads and the solder joints between the lamp beads and the light strings are exposed outside after installation and the solder joints are oxidized after a period of time.

Embodiments of the present disclosure may be implemented as follows.

An embodiment of the present disclosure provides a light emitting element, which includes: light-emitting lamp bead, a connecting wire, and covering member.

The light-emitting lamp bead is welded to the connecting wire to form a welding joint, the covering member covers the light-emitting lamp bead and the welding joint, and the covering member is integrally formed by injection molding.

In an optional embodiment, a plurality of light-emitting lamp beads are provided, the plurality of light-emitting lamp beads are arranged at intervals along a length direction of the connecting wire, and a plurality of covering members are arranged at the plurality of light-emitting lamp beads in a one-to-one corresponding manner.

In an optional embodiment, the light emitting element further includes a glue layer covering the light-emitting lamp bead and the welding joint, and the covering member is located outside the glue layer to cover the light-emitting lamp bead and the welding joint.

In an optional embodiment, the covering member is of a spherical shape.

In an optional embodiment, the welding joint is located at the light-emitting lamp bead and is close to a spherical center of the covering member.

An embodiment of the present disclosure further provides a processing apparatus for processing the light emitting element described above. The processing apparatus includes an injection molding mechanism and a molding die.

The molding die is provided with a fixing groove configured to fix the light-emitting lamp bead and the connecting wire, and the injection molding mechanism is configured to form the covering member around the surfaces of the light-emitting lamp bead and the welding joint by injection molding.

In an optional embodiment, the processing apparatus further includes a wire unreeling member and a wire take-up member.

The injection molding mechanism is located between the wire unreeling member and the wire take-up member, the wire unreeling member is configured such that the connecting wire to which the light-emitting lamp bead is fixed is wound therearound, and the wire take-up member is configured to receive an end of the connecting wire extended from the wire unreeling member.

In an optional embodiment, the processing apparatus further includes a wire tightening member.

The wire tightening member is located between the wire unreeling member and the wire take-up member, and the wire tightening member is configured to tension the connecting wire located between the wire unreeling member and the wire take-up member.

In an optional embodiment, the wire tightening member includes an upper roller, a lower roller, and a support frame.

Both the upper roller and the lower roller are connected to the support frame, and both the upper roller and the lower roller are rotatable about their own axes.

A wire tightening area is formed between the upper roller and the lower roller, and the wire tightening area is configured to allow an end of the connecting wire extended from the wire unreeling member to pass therethrough.

In an optional embodiment, the processing apparatus further includes a wire pressing member.

The wire pressing member is arranged between the wire unreeling member and the wire take-up member, and the wire pressing member is configured to tightly press the connecting wire.

In an optional embodiment, the processing apparatus further includes a driving member.

The driving member is in transmission connection to the wire pressing member to drive the wire pressing member to move relative to the wire take-up member.

The wire pressing member has a wire pressing state and a wire releasing state. When the wire pressing member is in the wire pressing state, the driving member drives the wire pressing member to move in a direction close to the wire take-up member so that the connecting wire is moved in a direction toward the wire take-up member. When the wire pressing member is in the wire releasing state, the driving member drives the wire pressing member to move in a direction close to the wire unreeling member.

In an optional embodiment, the driving member is a driving cylinder.

In an optional embodiment, the wire pressing member includes a movable plate and a fixed plate.

The connecting wire passes through between the movable plate and the fixed plate, and the movable plate is configured to be movable relative to the fixed plate so that the connecting wire is tightly pressed between the fixed plate and the movable plate.

In an optional embodiment, the wire pressing member further includes a connecting frame, both ends of the fixed plate are fixedly connected to the connecting frame, the movable plate is slidably connected to the connecting frame, and the movable plate is located on a position lower than the fixed plate.

In an optional embodiment, the wire pressing member further includes a drive motor, which is in transmission connection to the movable plate to drive the movable plate to move close to or away from the fixed plate.

In an optional embodiment, the processing apparatus further includes a positioning member.

The positioning member is arranged between the wire unreeling member and the wire take-up member, the positioning member is provided with a positioning through hole, and the positioning through hole is configured to allow the connecting wire to pass therethrough to position the connecting wire.

In an optional embodiment, the positioning through hole is a notch provided in an upper end surface of the positioning member.

In an optional embodiment, the positioning member is provided with at least two sets of positioning through holes, and each set of positioning through holes is configured to position the connecting wire of one of the light emitting elements.

A light emitting element according to an embodiment of the present disclosure includes a light-emitting lamp bead (s), a connecting wire, and a covering member(s). The light-emitting lamp bead is welded to the connecting wire to form a welding joint. The covering member covers the light-emitting lamp bead and the welding joint. The covering member is integrally formed by injection molding. Due to the arrangement of the covering member, the light-emitting lamp bead and the welding joint between the light-emitting lamp bead and the connecting wire are covered by the covering member to avoid exposure of the light-emitting lamp bead and the welding joint. Moreover, the covering member formed integrally by injection molding has a more beautiful appearance, compared to the conventional installation of fittings. In this way, the technical problems of the conventional modeled lamps existing in the prior art are alleviated, which are adversely affected in terms of service life and have poor appearance because both the lamp beads and the welding joints between the lamp beads and the light strings are exposed after installation and the welding joints are oxidized after a period of time.

Some embodiments of the present disclosure will be described in detail below with reference to the accompanying drawings. The following embodiments and features in the embodiments can be combined with each other without conflict.

As shown in FIG. 1, a light emitting element 10 according to this embodiment includes a light-emitting lamp bead(s) 100, a connecting wire 110, and a covering (or wrapping) member(s) 200. The light-emitting lamp bead 100 is welded to the connecting wire 110, and a welding joint (or solder joint) 120 is formed at the welding position. The covering member 200 covers the light-emitting lamp bead 100 and the welding joint 120. The covering member 200 is integrally formed by injection molding.

Specifically, the light-emitting lamp bead 100 is welded to the connecting wire 110, and a welding joint 120 is formed at the welded connection between the light-emitting lamp bead 100 and the connecting wire 110. The covering member 200 is wrapped around the position of the light-emitting lamp bead 100, so that the covering member 200 can cover the light-emitting lamp bead 100 and the welding joint 120 to avoid exposure of the light-emitting lamp bead 100 and the welding joint 120 to the outside environment, thereby preventing oxidization of the welding joint 120.

In addition, the covering member 200 is integrally formed by injection molding. The covering member 200 is formed by injection molding at the position of the light-emitting lamp bead 100 by using an injection molding apparatus, and both the light-emitting lamp bead 100 and the welding joint 120 are wrapped in the covering member 200. The covering member 200 formed by injection molding is more stable and has a regular shape and more beautiful appearance.

In an optional embodiment, a plurality of light-emitting lamp beads 100 are provided. The plurality of light-emitting lamp beads 100 are arranged at intervals along the length direction of the connecting wire 110. A plurality of covering members 200 are arranged around the plurality of light-emitting lamp beads 100 in a one-to-one correspondence manner to cover the plurality of light-emitting lamp beads 100 and their corresponding welding joints 120.

Specifically, a plurality of light-emitting lamp beads 100 are arranged on the connecting wire 110. The plurality of light-emitting lamp beads 100 are sequentially welded and fixed to the connecting wire 110 at intervals. The connecting wire 110 transmits electric energy to the plurality of light-emitting lamp beads 100.

In an optional embodiment, the covering member 100 is of a spherical shape. The spherical center of the spherical covering member 100 is approximately located at the welding joint 120. In other words, the welding joint 120 is located at an end of the light-emitting lamp bead 100 and is close to the spherical center of the covering member 100. It can be understood that, in other embodiments, the outer shape of the covering member 100 may be set as required, for example, in the shape of a five-pointed star, a snowflake shape, or the like.

This embodiment provides a light emitting element 10, which includes a light-emitting lamp bead(s) 100, a connecting wire 110, and a covering member(s) 200. The light-emitting lamp bead 100 is welded to the connecting wire 110 to form a welding joint 120. The covering member 200 covers the light-emitting lamp bead 100 and the welding joint 120. The covering member 200 is integrally formed by injection molding. Due to the arrangement of the covering member 200, the light-emitting lamp bead 100 and the welding joint 120 between the light-emitting lamp bead 100 and the connecting wire 110 are covered by the covering member 200 to avoid exposure of the light-emitting lamp bead 100 and the welding joint 120. Moreover, the covering member 200 formed integrally by injection molding has a more beautiful appearance, compared to the conventional installation of fittings. In this way, the technical problems of the conventional modeled lamps existing in the prior art are alleviated, which are adversely affected in terms of service life and have poor appearance because both the lamp beads and the welding joints 120 between the lamp beads and the light strings are exposed after installation and the welding joints 120 are oxidized after a period of time.

Figure 2:
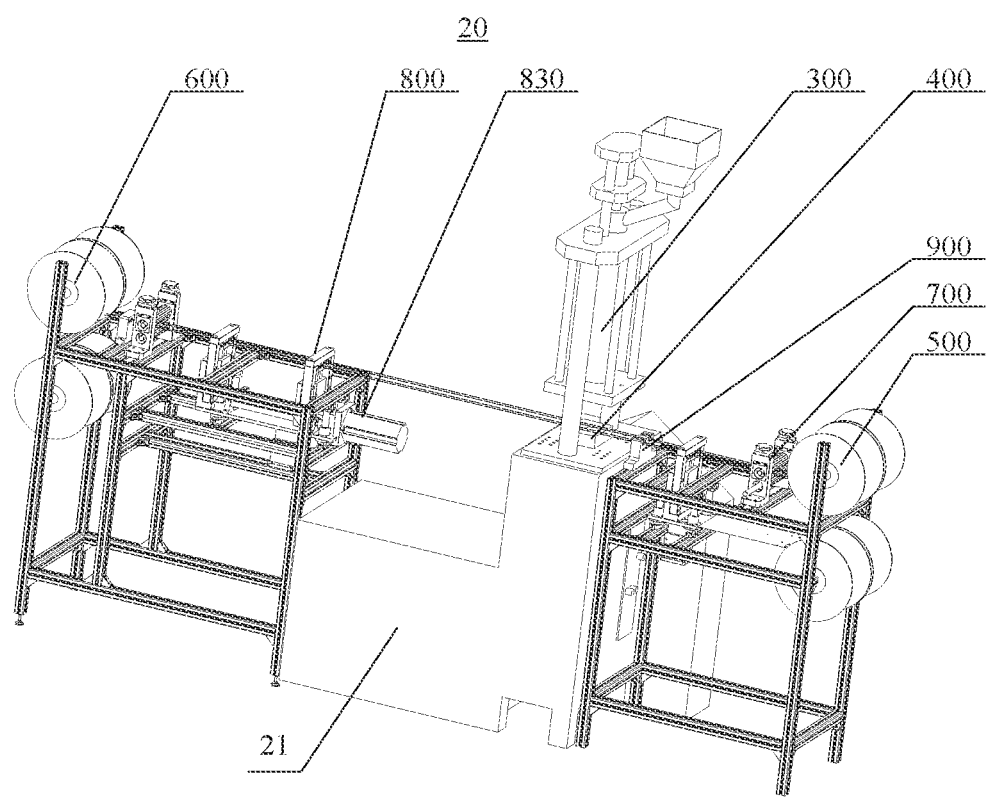
FIG. 2 is a schematic overall structural diagram of an apparatus for injection molding of a light emitting element according to an embodiment of the present disclosure.

As shown in FIG. 2, this embodiment further provides a processing (or machining) apparatus 20 for processing the light emitting element 10 described above. The processing apparatus 20 includes an injection molding mechanism 300 and a molding die 400. The molding die 400 is provided with a fixing groove configured to fix the light-emitting lamp bead 100 and the connecting wire 110. The injection molding mechanism 300 is configured to form the covering member 200 around the surfaces of the light-emitting lamp bead 100 and the welding joint 120 by injection molding.

Specifically, the injection molding mechanism 300 is specifically configured as an injection molding machine. The injection molding mechanism 300 has an injection molding processing station. The molding die 400 is placed on the injection molding processing station, and the molding die 400 is provided with a fixing groove in which the light-emitting lamp bead 100 and the connecting wire 110 can be fixed. After the fixing is completed, the injection molding mechanism 300 can form the covering member 200 at the position of the light-emitting lamp bead 100 by injection molding so that the covering member 200 covers the light-emitting lamp bead 100 and the welding joint 120. After the injection molding is completed, the connecting wire 110 to which the light-emitting lamp bead 100 and the covering member 200 are fixed is removed from the molding die 400, whereby a light emitting element 10 is formed.

It should be noted that after the light-emitting lamp bead 100 is welded to the connecting wire 110, it is necessary to apply a glue layer (not shown in the figure) to the positions of the light-emitting lamp bead 100 and the welding joint 120. The light-emitting lamp bead 100 and the welding joint 120 are covered with the glue layer, thereby effectively avoiding the problem of damage to the light-emitting lamp bead 100 caused because the injection molding mechanism 300 stamps directly on the light-emitting lamp bead 100 during injection molding of the covering member 200 by the injection molding mechanism 300.

In an optional embodiment, the processing apparatus 20 further includes a wire unreeling member 500 and a wire take-up member 600. The injection molding mechanism 300 is arranged between the wire unreeling member 500 and the wire take-up member 600. The wire unreeling member 500 is configured such that the connecting wire 110 to which the light-emitting lamp bead 100 is fixed is wound therearound. The wire take-up member 600 is configured to receive an end of the connecting wire 110 extended from the wire unreeling member 600.

Specifically, the wire unreeling member 500 and the wire take-up member 600 are located on the two sides of the injection molding mechanism 300, respectively. When in use, the connecting wire 110 provided with the light-emitting lamp bead 100 is wound around the wire unreeling member 500, and an end of the connecting wire 110 extended from the wire unreeling member 500 is connected to the wire take-up member 600, so that a part of the connecting wire 110 located between the wire unreeling member 500 and the wire unreeling member 600 passes through the injection molding mechanism 300, whereby a covering member 200 is formed around the light-emitting lamp bead 100 by injection molding using the injection molding mechanism 300.

The wire unreeling member 500 and the wire take-up member 600 are specifically configured as wire reels or spools. The wire unreeling member 500 and the wire take-up member 600 are rotated synchronously, so that a light-emitting lamp bead 100 on the connecting wire 110, around which no covering member 200 is provided, is moved to the processing station of the injection molding mechanism 300 so as to be processed by the injection molding mechanism 300, while a light-emitting lamp bead 100 on the connecting wire 110 that has been provided with a covering member 200 is moved away from the processing station of the injection molding mechanism 300.

In addition, the processing apparatus 20 further includes a fixing frame 21. The fixing frame 21 is configured to support the various components. The injection molding mechanism 300 is connected to the fixing frame 21. The wire unreeling member 500 and the wire take-up member 600 are fixed at the two ends of the fixing frame 21.

In an optional embodiment, the processing apparatus 20 further includes a wire tightening member 700. The wire tightening member 700 is arranged between the wire unreeling member 500 and the wire take-up member 600. The wire tightening member 700 is configured to tension the connecting wire 110 located between the wire unreeling member 500 and the wire take-up member 600.

Specifically, the wire tightening member 700 is arranged between the wire unreeling member 500 and the wire take-up member 600. The wire tightening member 700 can come into close contact with the connecting wire 110, so that the connecting wire 110 located between the wire unreeling member 500 and the wire take-up member 600 is tensioned.

Figure 3:
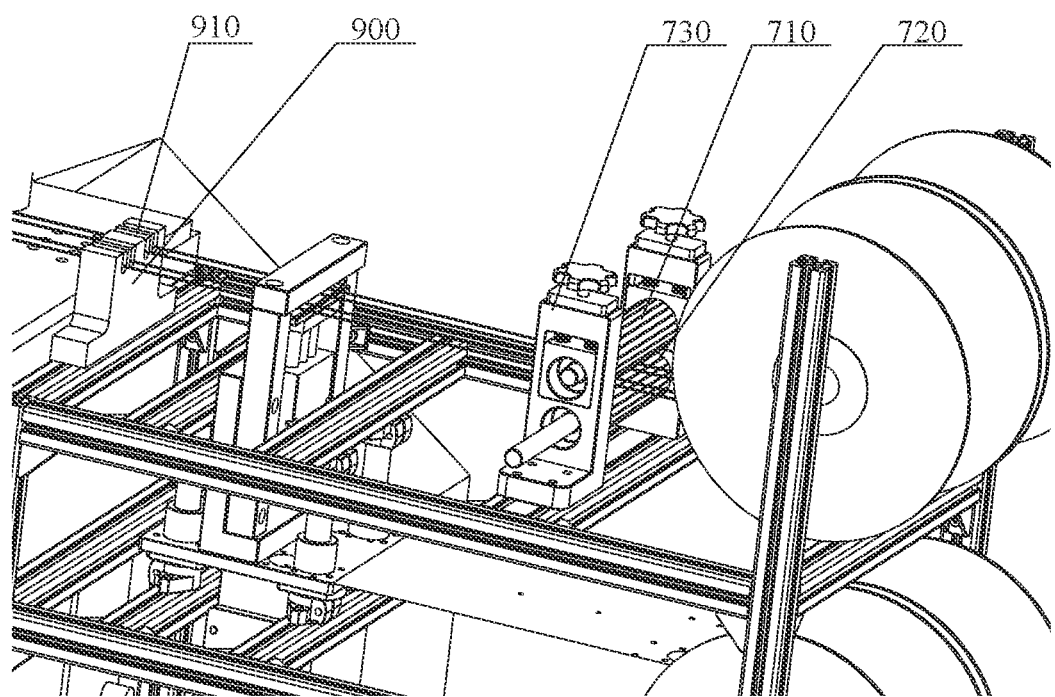
FIG. 3 is a schematic structural diagram of a wire tightening member of an apparatus for injection molding of a light emitting element according to an embodiment of the present disclosure.

In an optional embodiment, as shown in FIG. 3, the wire tightening member 700 includes an upper roller 710, a lower roller 720, and a support frame 730. Both the upper roller 710 and the lower roller 720 are connected to the support frame 730, and both the upper roller 710 and the lower roller 720 are rotatable along their own axes. A wire tightening area is formed between the upper roller 710 and the lower roller 720. The wire tightening area is configured such that an end of the connecting wire 110 extended from the wire unreeling member 500 passes therethrough and is connected to the wire take-up member 600.

Specifically, the support frame 730 is fixed to the fixing frame 21. Both the upper roller 710 and the lower roller 720 are connected to the support frame 730 by means of bearings, so that both the upper roller 710 and the lower roller 720 are rotatable about their own axes relative to the support frame 730. The upper roller 710 and the lower roller 720 are arranged one above the other, and there is a gap between the outer peripheral surface of the upper roller 710 and the outer peripheral surface of the lower roller 720. The gap forms a wire tightening area. An end of the connecting wire 110 extended from the wire unreeling member 500 passes through the wire tightening area between the upper roller 710 and the lower roller 720 and is connected to the wire take-up member 600 on a side of the wire tightening member 700 remote from the wire unreeling member 500. The connecting wire 110 located in the wire tightening area can abut against the upper roller 710 or the lower roller 720, so that the connecting wire 110 is brought into close contact with the outer peripheral surface of the upper roller 710 or the lower roller 720, whereby the connecting wire 110 is tensioned.

In the processing apparatus 20 according to this embodiment, a wire tightening member 700 is arranged between the wire unreeling member 500 and the wire take-up member 600, and the connecting wire 110 is tensioned by using the wire tightening member 700 to facilitate the movement of the connecting wire 110, so that a light-emitting lamp bead 100 fixed to the connecting wire 110 is moved to the processing station of the injection molding mechanism 300.

Figure 4:
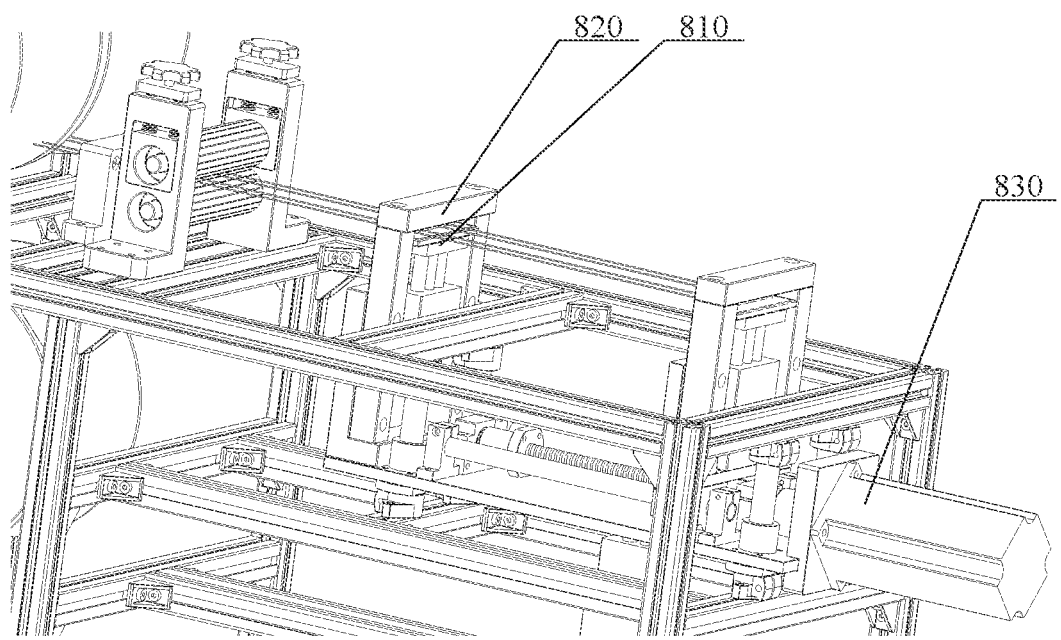
FIG. 4 is a schematic structural diagram of a wire pressing member of an apparatus for injection molding of a light emitting element according to an embodiment of the present disclosure.

In an optional embodiment, as shown in FIG. 4, the processing apparatus 20 according to this embodiment further includes a wire pressing member 800. The wire pressing member 800 is arranged between the wire unreeling member 500 and the wire take-up member 600. The wire pressing member 800 is configured to tightly press the connecting wire 110.

Specifically, the wire pressing member 800 is located between the wire unreeling member 500 and the wire take-up member 600. The wire pressing member 800 can tightly press the connecting wire 110 so as to fix the connecting wire 110.

In an optional embodiment, the processing apparatus 20 further includes a driving member 830. The driving member 830 is in transmission connection to the wire pressing member 800. The wire pressing member 800 has a wire pressing state and a wire releasing state. When the wire pressing member 800 is in the wire pressing state, the driving member 830 drives the wire pressing member 800 to move in a direction close to the wire take-up member 600 so that the connecting wire 110 is moved in a direction toward the wire take-up member 600. When the wire pressing member 800 is in the wire releasing state, the driving member 830 drives the wire pressing member 800 to move in a direction close to the wire unreeling member 500.

Specifically, the driving member 830 is in transmission connection to the wire pressing member 800. When the wire pressing member 800 tightly presses the connecting wire 110, the driving member 830 can drive the wire pressing member 800 to move in a direction toward the wire take-up member 600 so that the connecting wire 110 is moved in the direction toward the wire take-up member 600. When the wire pressing member 800 releases the connecting wire 110, the driving member 830 drives the wire pressing member 800 to move in a direction toward the wire unreeling member 500 so that the connecting wire 110 returns to the initial position so as to continue to drive the movement of the connecting wire 110 in the direction toward the wire take-up member 600. Such reciprocating movements enable the connecting wire 110 to move in the direction toward the wire take-up member 600.

In an optional embodiment, the wire pressing member 800 includes a movable plate 810 and a fixed plate 820. The connecting wire 110 passes through between the movable plate 810 and the fixed plate 820. The movable plate 810 is configured to be movable relative to the fixed plate 820 so that the connecting wire 110 is clamped between the fixed plate 820 and the movable plate 810, or the connecting wire 110 is released from therebetween.

Specifically, a connecting frame is arranged on the fixing frame 21. The two ends of the fixed plate 820 are fixedly connected to the connecting frame, respectively, so that the fixed plate 820 is connected to the fixing frame 21. The movable plate 810 is slidably connected to the connecting frame, and the movable plate 810 is located on a position lower than the fixed plate 820. A drive motor is arranged under the movable plate 810. The drive motor drives the movable plate 810 to move in a direction close to or away from the fixed plate 820, thereby changing the distance between the fixed plate 820 and the movable plate 810. The connecting wire 110 is located between the movable plate 810 and the fixed plate 820. When the movable plate 810 moves toward the fixed plate 820, the connecting wire 110 is tightly pressed by the movable plate 810 and the fixed plate 820, so that the connecting wire 110 is clamped between the fixed plate 820 and movable plate 810, and thus the connecting wire 110 can be easily driven to move.

The driving member 830 is specifically configured as a driving cylinder. The driving cylinder is in transmission connection to the connecting frame to drive the movement of the support frame, whereby the fixed plate 820 and the movable plate 810 are driven to move synchronously, and the connecting wire 110 clamped by the fixed plate 820 and by the movable plate 810 is also moved therewith.

In an optional embodiment, as shown in FIG. 3, the processing apparatus 20 further includes a positioning member 900. The positioning member 900 is arranged between the wire unreeling member 500 and the wire take-up member 600. The positioning member 900 is provided with a positioning through hole. The connecting wire 110 passes through the positioning through hole so that the connecting wire 110 is positioned.

Specifically, a positioning member 900 is arranged between the wire unreeling member 500 and the wire take-up member 600. The positioning member 900 is specifically configured as a positioning block. The positioning member 900 is provided with a positioning through hole. During the movement of the connecting wire 110, the connecting wire 110 passes through the positioning through hole so that the position of the connecting wire 110 is restricted.

The processing apparatus 20 according to this embodiment is provided with the positioning member 900 to effectively restrict the position of the connecting wire 110 and ensure the movement of a specific location of the connecting wire 110, so that the light-emitting lamp bead 100 on the connecting wire 110 is accurately moved to the molding die 400.

In an optional embodiment, the positioning through hole 910 is a notch provided in the upper end surface of the positioning member 900. In other words, the positioning through hole 910 is provided through the upper end surface of the positioning member 900, whereby an opening is formed in the upper end surface of the positioning member 900, so that the connecting wire 110 can enter the positioning through hole 910 from the opening.

In an optional embodiment, the positioning member 900 is provided with at least two sets of positioning through holes 910, and each set of positioning through holes 910 is configured to position the connecting wire 110 of one light emitting element 10. In this way, the connecting wires 110 of at least two light emitting elements 10 can be simultaneously positioned by means of the positioning member 900.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may still be modified, or some or all of the technical features thereof may be replaced with equivalents. Such modifications or replacements will not cause the essence of the corresponding technical solutions to depart from the scope of the technical solutions of the embodiments of the present disclosure.

INDUSTRIAL APPLICABILITY

In summary, the present disclosure provides a light emitting element and a processing apparatus therefor, thereby solving the technical problems of the conventional modeled lamps existing in the prior art, which are adversely affected in terms of service life and have poor appearance because both the lamp beads and the welding joints between the lamp beads and the light strings are exposed outside after installation and the welding joints are oxidized after a period of time.

What is claimed is:
1. A processing apparatus for processing the light emitting element comprising: a light-emitting lamp bead, a connecting wire, and a covering member, wherein the light-emitting lamp bead is welded to the connecting wire, so as to form a welding joint, the covering member covers the light-emitting lamp bead and the welding joint, and the covering member is integrally formed by injection molding, wherein the processing apparatus comprises an injection molding mechanism and a molding die,
  wherein the molding die is provided with a fixing groove configured to fix the light-emitting lamp bead and the connecting wire, and the injection molding mechanism is configured to form the covering member on surfaces of the light-emitting lamp bead and the welding joint by injection molding, wherein the processing apparatus further comprises a wire unreeling member and a wire take-up member, wherein the injection molding mechanism is located between the wire unreeling member and the wire take-up member, the wire unreeling member is configured such that the connecting wire to which the light-emitting lamp bead is fixed is wound therearound, and the wire take-up member is configured to receive an end of the connecting wire extended from the wire unreeling member, wherein the processing apparatus further comprises a wire tightening member, wherein the wire tightening member is located between the wire unreeling member and the wire take-up member, and the wire tightening member is configured to make the connecting wire tensioned, with the connecting wire located between the wire unreeling member and the wire take-up member, wherein the wire tightening member comprises an upper roller, a lower roller, and a support frame, wherein both the upper roller and the lower roller are connected to the support frame, and both the upper roller and the lower roller are rotatable about their own axes; and a wire tightening area is formed between the upper roller and the lower roller, wherein the wire tightening area is configured to allow an end of the connecting wire extended from the wire unreeling member to pass therethrough.

2. The processing apparatus according to claim 1, further comprising a wire pressing member, wherein the wire pressing member is arranged between the wire unreeling member and the wire take-up member, and the wire pressing member is configured to tightly press the connecting wire.

3. The processing apparatus according to claim 2, further comprising a driving member, wherein the driving member is in transmission connection to the wire pressing member, so as to drive the wire pressing member to move relative to the wire take-up member; and the wire pressing member has a wire pressing state and a wire releasing state, wherein when the wire pressing member is in the wire pressing state, the driving member drives the wire pressing member to move in a direction close to the wire take-up member, so that the connecting wire is moved in a direction toward the wire take-up member; and when the wire pressing member is in the wire releasing state, the driving member drives the wire pressing member to move in a direction close to the wire unreeling member.

4. The processing apparatus according to claim 3, wherein the driving member is a driving cylinder.

5. The processing apparatus according to claim 2, wherein the wire pressing member comprises a movable plate and a fixed plate, wherein the connecting wire passes through between the movable plate and the fixed plate, and the movable plate is configured to be movable relative to the fixed plate, so that the connecting wire is tightly pressed between the fixed plate and the movable plate.

6. The processing apparatus according to claim 5, wherein the wire pressing member further comprises a connecting frame, wherein both ends of the fixed plate are fixedly connected to the connecting frame, the movable plate is slidably connected to the connecting frame, and the movable plate is located on a position lower than the fixed plate.

7. The processing apparatus according to claim 6, wherein the wire pressing member further comprises a drive motor, wherein the drive motor is in transmission connection to the movable plate, so as to drive the movable plate to move close to or away from the fixed plate.

8. The processing apparatus according to claim 1, further comprises a positioning member, wherein the positioning member is arranged between the wire unreeling member and the wire take-up member, wherein the positioning member is provided with a positioning through hole, and the positioning through hole is configured to allow the connecting wire to pass therethrough, so as to position the connecting wire.

9. The processing apparatus according to claim 8, wherein the positioning through hole is a notch provided in an upper end surface of the positioning member.

10. The processing apparatus according to claim 8, wherein the positioning member is provided with at least two sets of positioning through holes, and each set of positioning through holes is configured to position the connecting wire of one light emitting element.

* * * * *